United States Patent [19]
Efron et al.

[11] Patent Number: 6,084,947
[45] Date of Patent: Jul. 4, 2000

[54] DIGITAL SIGNAL DETECTOR AND METHOD

[75] Inventors: David W. Efron, Highland Park; John M. Zdenek, Riverside, both of Ill.

[73] Assignee: Rockwell International Corporation, Costa Mesa, Calif.

[21] Appl. No.: 08/686,046

[22] Filed: Jul. 24, 1996

[51] Int. Cl.[7] .................................................. H04M 1/24
[52] U.S. Cl. ................................ 379/34; 379/16; 379/377
[58] Field of Search .......................... 379/1, 5, 9–10, 379/15, 16, 23, 27, 32, 34, 28, 12, 22, 29, 353, 381, 377, 274, 93.09, 93.11, 93.14; 381/46

[56] References Cited

U.S. PATENT DOCUMENTS

| | | | |
|---|---|---|---|
| 3,917,915 | 11/1975 | Karras | 379/34 |
| 4,066,843 | 1/1978 | Waks et al. | |
| 4,356,348 | 10/1982 | Smith | 379/34 |
| 5,007,000 | 4/1991 | Baldi | 379/34 |
| 5,444,759 | 8/1995 | Vogt, III et al. | 379/34 |
| 5,528,679 | 6/1996 | Taarud | 379/34 |
| 5,553,116 | 9/1996 | Avni | 379/34 |

*Primary Examiner*—Curtis A. Kuntz
*Assistant Examiner*—Binh K. Tieu
*Attorney, Agent, or Firm*—Welsh & Katz, Ltd.

[57] ABSTRACT

A signal detector 100 and method detects digital signals on a signal path 102. The signal detector 100 comprises a sample detector 108 which detects digital code samples for past sample periods and the instant sample period. Past digital code samples are stored in a sample storage 114. Past digital code samples and the instant digital code sample are compared by a comparator 112. If the samples are equal, the signal path 102 is idle. If the samples are unequal, the signal path 102 is in use. It is contemplated that the past digital code sample substantially immediately preceding the instant digital code sample will be compared to the instant digital code sample.

10 Claims, 2 Drawing Sheets

DIGITAL SIGNAL DETECTOR AND METHOD

BACKGROUND OF THE INVENTION

The present invention relates generally to digital signal detection circuits and, more particularly, to a digital signal detector and method for detecting the presence or absence of digital information on a signal path, such as a telephone line, wherein digital code samples from past sample periods are compared with a digital code sample from an instant sample period. If no change has occurred over one or more sample periods, the signal path is idle and no digital information is being transmitted on the signal path.

Numerous devices associated with the telephone industry rely upon detection of whether a telephone line is connected to a live calling circuit or to an inactive circuit. In other words, whether a telephone line is currently being used. For example, automatic call distributors (ACDs) perform various functions which are dependent upon the detection of signals on a telephone line, such as answer detection and the like.

Prior systems utilize analog automatic gain control (AGC) or digital signal line processor circuits which compare detected signal levels with a preset, or monitored background, level. When the detected signal level drops below the preset level for predetermined amount of time, the telephone line is considered idle. Conversely, if the detected signal level exceeds the preset level, the telephone line is considered active (i.e. is transmitting information). These methods are influenced by the amount of digitized noise present. For example, if the preset level is set below the background noise level of the telephone signal, the prior methods would never indicate that the telephone line is idle. Additionally, if the message information is buried amongst background noise, the actual signal presence may never be detected. Background noise, as is well known, may also be generated during the digitization process by the detector amplifier or by the detector circuit. And, as is also well known, the amount of background noise typically changes over time as the electronic circuitry ages.

Accordingly, there is a need in the art for a signal detector and method for detecting digital information on a telephone line which is substantially independent of the amount of noise present on the telephone line at any given time, which provides relatively accurate results and which is relatively simple to construct.

SUMMARY OF THE INVENTION

This need is met by a signal detector and method in accordance with the present invention wherein digital code samples from past sample periods are compared with a digital code sample from an instant sample period to determine whether digital information is present on a signal path, such as a telephone line.

In accordance with one aspect of the present invention, a sample detector detects the digital code samples for past sample periods and a digital code sample for an instant sample period. The digital code samples are stored in a sample storage. A comparator then compares the past digital code samples and the instant digital code sample. If the past and instant digital code samples are equal, the signal path is idle. If the respective digital code samples are unequal, the signal path is in use and has digital information present thereon.

The comparator may compare any number of past digital code samples with the instant digital code sample or only the past digital code sample substantially immediately preceding the instant digital code sample may be compared to the instant digital code sample.

In accordance with another aspect of the present invention, a method for detecting digital information on a signal path is provided. The method comprises the steps of detecting a past digital code sample for a past sample period and an instant digital code sample for an instant sample period on the signal path; storing the past digital code sample for the past sample period; comparing the past digital code sample for the past sample period to the instant digital code sample for the instant sample period; and determining whether digital signals are present on the signal path based on the comparison. The step of comparing may comprise the step of comparing the past digital code sample obtained in a past sample period substantially immediately preceding the instant sample period. The step of determining may comprise the step of determining that digital signals are present on the signal path when the past digital code sample and the instant digital code sample are unequal. Further, the method may comprise the step of defining a length of the past and instant sample periods.

These and other features and advantages of the present invention will become apparent from the following detailed description, the accompanying drawings and the appended claims.

DETAILED DESCRIPTION OF THE INVENTION

Figure 1:
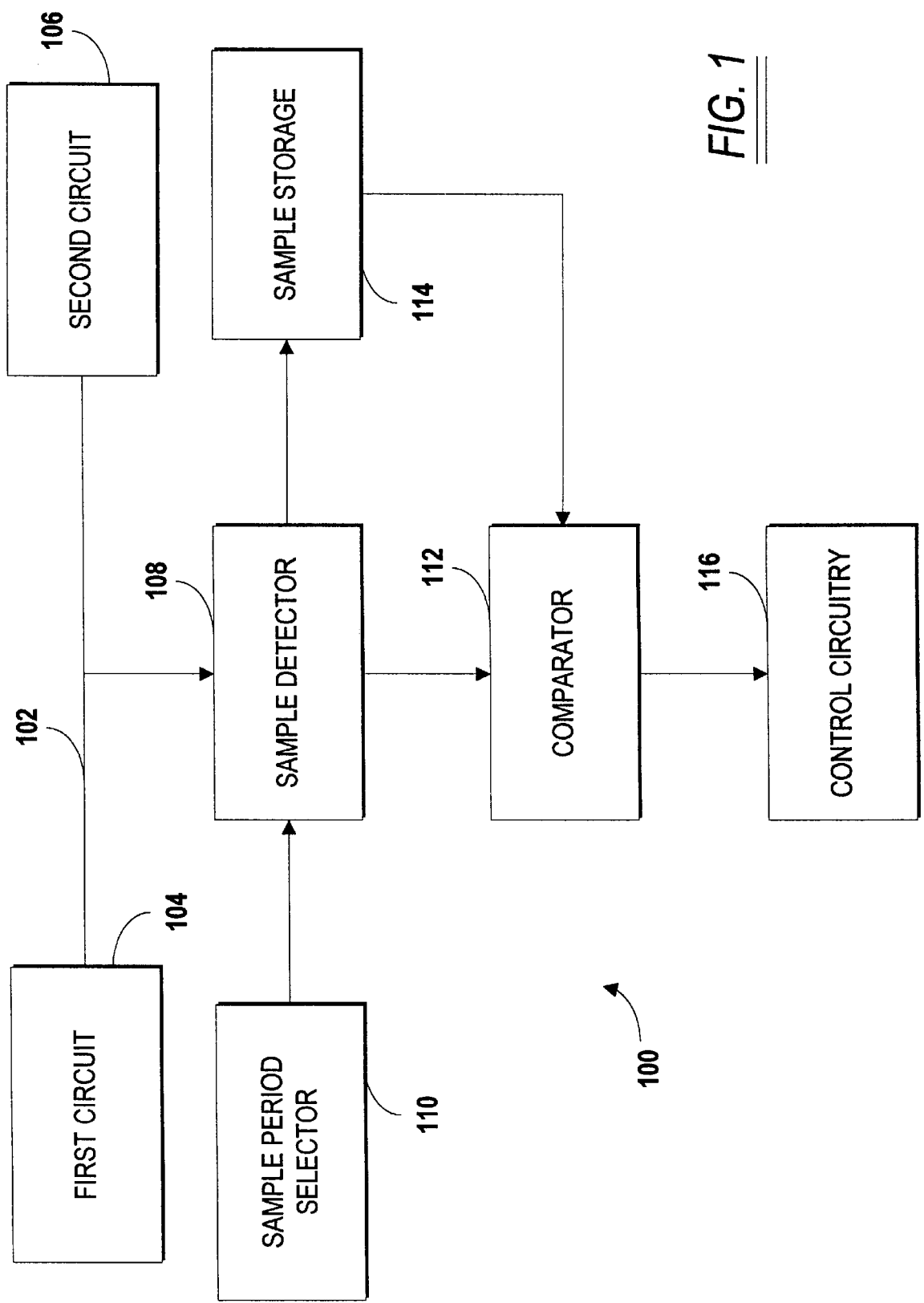
FIG. 1 is a block diagram of a signal detector in accordance with the present invention for detecting digital information on a signal path.

A signal detector 100 for detecting the presence, or conversely the absence, of digital information on a signal path 102, such as a telephone line, in accordance with the present invention is shown in FIG. 1. The signal path 102 transmits digital information between a first circuit 104 and a second circuit 106. It should be understood that the first and second circuits 104 and 106 are simplified representations of various components and may comprise many devices, components, and the like which transmit and/or receive digital information. For example, the first circuit 104 may comprise an automatic call distributor (ACD) and the second circuit 106 may comprise an agent telephone, or console, for answering telephone calls routed by the ACD. In such a system, it may be advantageous to know when a telephone call is in progress on the signal path 102, such as to check agent availability status. The present invention may therefore be advantageously employed to detect whether a conversation is occurring with the agent in such a system.

In the present invention, a sample detector 108 is connected to the signal path 102 to receive any information transmitted over the path 102. As will be readily apparent, the sample detector 108 receives a split of the digital information and does not alter, or obstruct, the communications between the first and second circuits 104 and 106. The sample detector 108 detects digital code samples defined by a sample period of time which is set by a sample period selector 110. The sample period selector 110 may be designed to provide a fixed sample period length or may be programmable, or changeable, to provide adjustments of the length of sample periods. A number of devices (both hardware and software based) for setting a sample period are known in the art. Further, the sample period selector 110 selects the one or more past sample periods for which digital code samples are recorded. For example, the digital code sample substantially immediately preceding the instant digital code sample may be recorded. However, any of the past digital code samples may be used, such as the digital code sample located five sample periods before the instant sample period and the like. Since the structure and philosophy of the sample period selector 110 are not important to the present invention beyond the generation of an appropriate sample period and selecting which past digital code sample to record, details of such devices will not be further disclosed herein.

The digital code sample for the current sample period, or instant sample period, is provided by the sample detector 108 to a comparator 112. Digital code samples for past sample periods are stored in a sample storage 114. The sample storage 114 provides selected digital code samples from past sample periods to the comparator 112. The comparator 112 compares the digital code samples from the past sample periods with the digital code sample from the instant sample period. If the digital code samples are unequal, the signal path 102 is in use and the comparator 112 provides an appropriate output to a control circuitry 116. The control circuitry 116 is an exemplary representation of a circuit which may operate based on whether the signal path 102 is in use. The structure, control and arrangement of these conventional components and circuits have, for the most part, been illustrated in the drawings by readily understandable block representations and schematic diagrams, which show only those specific details that are pertinent to the present invention, in order not to obscure the disclosure with structural details which will be readily apparent to those skilled in the art having the benefit of the description herein.

The sample storage 114 may store only the digital code sample from the past sample period substantially immediately preceding the instant sample period. Consequently, the comparator 112 may be continually comparing the digital code sample of the instant sample period and the digital code sample of the past sample period substantially immediately preceding the instant sample period. A simplified diagram showing one implementation of a signal detector in accordance with the present invention which compares the two digital code samples is shown in FIG. 2.

Figure 2:
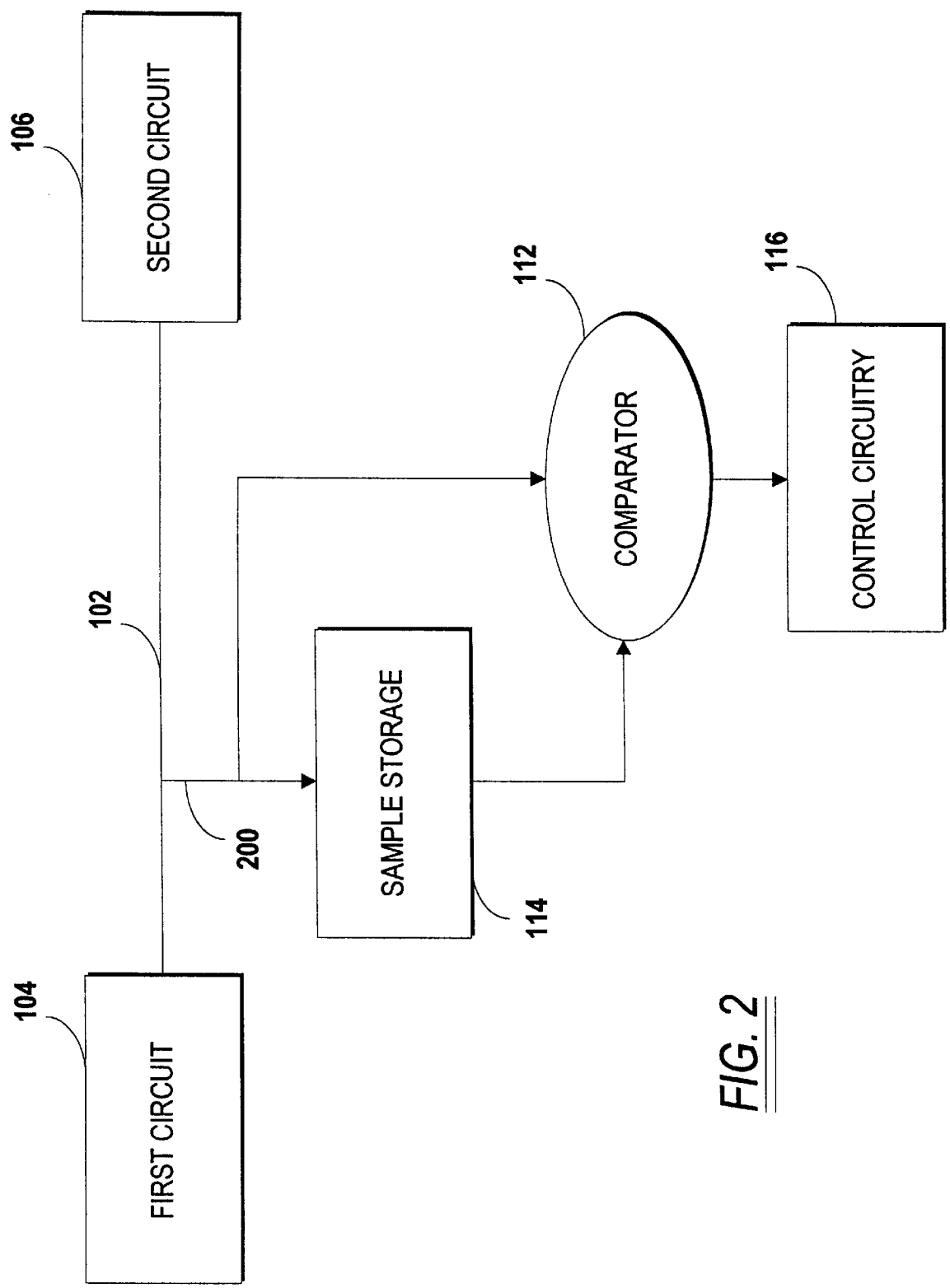
FIG. 2 is a block diagram of an alternative configuration of a signal detector in accordance with the present invention for detecting digital information on a signal path.

In FIG. 2, the sample storage 114 and the comparator 112 receive the split of the digital information directly from the signal path 102. Thus, the sample detector 108 shown in FIG. 1 may comprise a line 200 splitting off of the signal path 102. The sample storage 114 provides the digital code sample from the preceding sample period to the comparator 112. The comparator 112 then compares the digital code sample from the preceding sample period and the digital code sample from the instant sample period as the digital code sample from the instant sample period is being received. Once the instant sample period is finished, the digital code sample is stored as a past digital code sample in the sample storage 114 and a new instant sample period is begun.

In accordance with the present invention, a method for detecting digital information on a signal path, such as a signal path 102, comprises the steps of detecting a past digital code sample for a past sample period and an instant digital code sample for an instant sample period on the signal path; storing the past digital code sample for the past sample period; comparing the past digital code sample for the past sample period to the instant digital code sample for the instant sample period; and determining whether digital information is present on the signal path based on the comparison. Preferably, the step of comparing comprises the step of comparing the past digital code sample obtained in a past sample period substantially immediately preceding the instant sample period. Digital information may be present on the signal path when the past digital code sample and the instant digital code sample are unequal. Alternatively, digital information may be present on the signal path when the past digital code sample and the instant digital code sample differ by an amount greater than a predetermined setpoint.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A signal detector for detecting digital information from a first telephone user to a second telephone user on a signal path of a telephone line comprising:

a sample detector for detecting digital code samples of the first user to the second user on the telephone line, the digital code samples being defined by a sample period and being detected for at least one telephone line past sample period and an instant sample period;

a sample storage for storing at least one of the digital code samples for the at least one past sample period; and a comparator for comparing the digital code sample for the instant sample period and the at least one of the digital code samples for the at least one past sample period to determine whether digital information is present on the signal path.

2. The signal detector as recited in claim 1 wherein the comparator comprises:

means for comparing the digital code sample for the instant sample period and the digital code sample for a past sample period substantially immediately preceding the instant sample period.

3. The signal detector as recited in claim 1 comprising:

a sample period selector for defining length of a sample period.

4. The signal detector as recited in claim 1 comprising:

a sample period selector for selecting one of the at least one past sample period for which the at least one the digital code sample is stored.

5. The signal detector as recited in claim 4 wherein the sample period selector comprises means for selecting a past sample period which is a plurality of sample periods prior to the instant sample period.

6. The signal detector as recited in claim 1 wherein the signal path comprises a telephone line.

7. A method for detecting digital information from a first telephone user to a second telephone user on a signal path of a telephone line comprising the steps of:

detecting at least one past digital code sample of the first user to the second user on the telephone line for at least one past sample period and an instant digital code sample on the telephone line for an instant sample period on the signal path;

storing the at least one past digital code sample for the at least one past sample period;

comparing the at least one past digital code sample for the at least one past sample period to the instant digital code sample for the instant sample period; and determining whether digital information is present on the signal path based on the comparison.

8. The method as recited in claim 7 wherein the step of comparing comprises the step of:

comparing a past digital code sample obtained in a past sample period substantially immediately preceding the instant sample period.

9. The method as recited in claim 7 wherein the step of determining comprises the step of:

determining that digital information is present on the signal path when the at least one past digital code sample and the instant digital code sample are unequal.

10. The method as recited in claim 7 comprising the step of:

defining a length of the at least one past sample period and the instant sample period.

* * * * *